(12) United States Patent
Malloy et al.

(10) Patent No.: US 10,518,511 B2
(45) Date of Patent: Dec. 31, 2019

(54) WRAPPABLE PROTECTIVE SLEEVE WITH CLOSURE AND LOCATING FEATURE AND METHODS OF CONSTRUCTION AND USE THEREOF

(71) Applicant: Federal-Mogul Powertrain, Inc., Southfield, MI (US)

(72) Inventors: Cassie M. Malloy, Blue Bell, PA (US); Jean Ferrand, Crepy en Valois (FR); Danny E. Winters, Downington, PA (US); Tianqi Gao, Exton, PA (US)

(73) Assignee: Federal-Mogul Powertrain LLC, Southfield, MI (US)

( * ) Notice: Subject to any disclaimer, the term of this patent is extended or adjusted under 35 U.S.C. 154(b) by 430 days.

(21) Appl. No.: 13/952,441

(22) Filed: Jul. 26, 2013

(65) Prior Publication Data

US 2015/0027623 A1    Jan. 29, 2015

(51) Int. Cl.
    *B32B 37/00*    (2006.01)
    *B32B 37/12*    (2006.01)
    (Continued)

(52) U.S. Cl.
    CPC ........ *B32B 37/0076* (2013.01); *B32B 37/025* (2013.01); *B32B 37/1292* (2013.01); *C09J 7/21* (2018.01); *C09J 7/401* (2018.01); *F16L 57/00* (2013.01); *H02G 3/0481* (2013.01); *B32B 2405/00* (2013.01); *B32B 2433/00* (2013.01); *B32B 2571/00* (2013.01);
    (Continued)

(58) Field of Classification Search
    CPC ............. H02G 3/0481; C09J 2203/302; B32B 37/0076
    See application file for complete search history.

(56) References Cited

U.S. PATENT DOCUMENTS 2,854,352 A    9/1958    Gronemeyer
3,540,975 A    11/1970    Wright et al.
(Continued)

FOREIGN PATENT DOCUMENTS

CN    201601426 U    10/2010
CN    202338734 U    7/2012
(Continued)

OTHER PUBLICATIONS

International Search Report dated Oct. 29, 2014 (PCT/US2014/048141).

*Primary Examiner* — Philip C Tucker
*Assistant Examiner* — John Blades
(74) *Attorney, Agent, or Firm* — Robert L. Stearns; Dickinson Wright, PLLC

(57) ABSTRACT

A wrappable protective sleeve for providing protection to at least one elongate member contained therein and methods of construction and use thereof are provided. The sleeve includes a flexible textile wall having opposite inner and outer faces bounded by opposite edges and opposite ends. The opposite edges extend generally parallel to one another between the opposite ends. A pair of adhesive layers is bonded to the inner face, with each of the adhesive layers being spaced from one another. The adhesive layers extend between the opposite ends adjacent the opposite edges. Further, a release paper is releasably adhered to the pair of adhesive layers for subsequent removal and use of the sleeve.

9 Claims, 3 Drawing Sheets

(51) Int. Cl.
*F16L 57/00* (2006.01)
*H02G 3/04* (2006.01)
*C09J 7/40* (2018.01)
*C09J 7/21* (2018.01)
*B60R 16/02* (2006.01)

(52) U.S. Cl.
CPC ....... *B60R 16/0215* (2013.01); *C09J 2400/28* (2013.01); *Y10T 156/1093* (2015.01); *Y10T 428/1476* (2015.01)

(56) References Cited

U.S. PATENT DOCUMENTS

| | | | |
|---|---|---|---|
| 4,581,027 A * | 4/1986 | Alvarado | A61F 13/5515 604/385.13 |
| 5,008,489 A | 4/1991 | Weeks, Jr. et al. | |
| 5,185,501 A * | 2/1993 | Oha | H02G 3/266 174/135 |
| 5,211,784 A | 5/1993 | Haibach et al. | |
| 5,278,356 A | 1/1994 | Miller | |
| 5,352,855 A | 10/1994 | Potter | |
| 5,804,510 A | 9/1998 | Spies et al. | |
| 6,936,553 B2 | 8/2005 | Von Samson-Himmelstjerna | |
| 6,960,722 B2 | 11/2005 | Frderick et al. | |
| 7,282,250 B2 | 10/2007 | Musahl et al. | |
| RE41,348 E | 5/2010 | Frederick et al. | |
| 2002/0053392 A1 | 5/2002 | Lodde | |
| 2006/0289197 A1 | 12/2006 | Yabe | |
| 2007/0295795 A1 * | 12/2007 | Clougherty | B65D 3/266 229/202 |
| 2008/0295896 A1 | 12/2008 | Maida | |
| 2009/0311456 A1 | 12/2009 | Harris | |
| 2012/0037263 A1 | 2/2012 | Malloy | |
| 2013/0040081 A1 | 2/2013 | Yoshimura et al. | |
| 2013/0098660 A1 | 4/2013 | Igarashi | |

FOREIGN PATENT DOCUMENTS

| | | |
|---|---|---|
| CN | 103109008 A | 5/2013 |
| CN | 202946784 U | 5/2013 |
| DE | 102005013124 A1 | 9/2006 |
| DE | 102006024173 A1 | 11/2006 |
| EP | 886357 A2 | 12/1998 |
| JP | S60021114 U | 2/1985 |
| JP | S61117525 U | 7/1986 |
| JP | 2003143731 A | 5/2003 |
| JP | 2006327656 A | 12/2006 |
| JP | 2009247070 A | 10/2009 |
| JP | 2013143848 A | 7/2013 |
| WO | 2012145389 A2 | 10/2012 |

* cited by examiner

WRAPPABLE PROTECTIVE SLEEVE WITH CLOSURE AND LOCATING FEATURE AND METHODS OF CONSTRUCTION AND USE THEREOF

BACKGROUND OF THE INVENTION

1. Technical Field

This invention relates generally to protective sleeves for providing protection to elongate members contained therein, and more particularly to wrappable protective sleeves and to their methods of construction and use.

2. Related Art

Wrappable protective sleeves for providing protection to a straight elongate member contained therein are known. Typically, wrappable protective sleeves are fixed about the elongate member by a separate fastening feature, such as with tape or tie wraps wrapped circumferentially about the sleeve wall. Although tape and tie wraps devices can prove effective, they come at a cost by having to have them in inventory, and in addition, further require labor expense and time for application. Further, particularly with tape, it can become bulky and relatively heavy, and further yet, subsequent removal, such as may be necessary to service the elongate member, can prove laborious.

In addition to providing protection about straight elongate members, it is also know to wrap a complex protective sleeve or tape about a T-shaped union of elongate members to provide protection about the T-shape union. Unfortunately, the complex protective sleeves, generally having specialized T-shaped configurations themselves to allow them to be wrapped conformingly about the T-shaped union, are expensive in manufacture, and further, can require a certain degree of expertise and experience to apply. As for use of tape, the same issues discussed previously, namely, inventory costs and laborious application and removal, hold true to an even increased degree given the complexity of having to wrap the tape about a T-shape configuration.

SUMMARY OF THE INVENTION

In accordance with one aspect of the invention, a wrappable protective sleeve for providing protection to at least one elongate member contained therein is provided. The sleeve includes a flexible textile wall having opposite inner and outer faces bounded by opposite edges and opposite ends. The opposite edges extend generally parallel to one another between the opposite ends. A pair of adhesive layers is bonded to the inner face in spaced relation from one another. The adhesive layers extend between the opposite ends adjacent the opposite edges. Further, a release paper is releasably adhered to the pair of adhesive layers.

In accordance with another aspect of the invention, the opposite edges of the sleeve wall are spaced from one another along a width of the wall and the release paper has a width less than the width of the wall.

In accordance with another aspect of the invention, each of the adhesive layers has a width and the width of the release paper is substantially equal to the combined widths of the adhesive layers.

In accordance with another aspect of the invention, the wall has a tubular configuration with the release paper adhered to the pair of adhesive layers.

In accordance with another aspect of the invention, one adhesive layer from the pair of adhesive layers is adapted to be adhered to an outer surface of the at least one elongate member and the other adhesive layer of the pair of adhesive layers is adapted to be adhered to the outer face of the wall.

In accordance with another aspect of the invention, each of the pair of adhesive layers is adapted to be adhered to a common elongate member and each of the pair of adhesive layers is adapted to be adhered to itself.

In accordance with another aspect of the invention, the wrappable protective sleeve is adapted to be wrapped about a T-shaped union of a plurality of elongate members.

In accordance with another aspect of the invention, the wall is formed of interlaced yarn.

In accordance with another aspect of the invention, the wall is formed of a nonwoven material.

In accordance with another aspect of the invention, a method of protecting at least a portion of at least one elongate member is provided. The method includes providing a flexible textile wall having opposite inner and outer faces bounded by opposite edges and opposite ends with a pair of adhesive layers bonded to the inner face in spaced relation from one another with a single release paper being releasably adhered to the pair of adhesive layers. Further, removing the single release paper from the pair of adhesive layers and adhering at least one of the adhesive layers to at least one elongate member to be protected. Then, wrapping the wall about the portion of the at least one elongate member to be protected and adhering at least one of the adhesive layers to at least one of the outer face of the wall or to itself to fix the wall in its wrapped configuration about the portion of the at least one elongate member to be protected.

In accordance with another aspect of the invention, the method can further include adhering one of the adhesive layers to a single elongate member to be protected and then wrapping the wall about the elongate member and bringing the opposite edges into overlapping relation with one another and adhering the other of the adhesive layers to the outer face of the wall.

In accordance with another aspect of the invention, the method can further include providing a plurality of elongate members having a generally T-shaped union and adhering a portion of the adhesive layers to a common one of the plurality of elongate members and then wrapping the wall about the T-shaped union and adhering a portion of each adhesive layer to itself.

In accordance with another aspect of the invention, the method can further include providing the wall being formed from interlaced yarn.

In accordance with another aspect of the invention, the method can further include providing the wall being formed from a nonwoven material.

In accordance with another aspect of the invention, a method of constructing a wrappable protective sleeve is provided. The method includes forming a flexible textile wall having opposite inner and outer faces bounded by opposite edges and opposite ends. Then, bonding a pair of adhesive layers to the inner face in spaced relation from one another adjacent the opposite edges, and further, bonding a single release paper to the wall via the pair of adhesive layers.

In accordance with another aspect of the invention, the method of construction can further include bonding the pair of adhesive layers to the single release paper prior to bonding the bonding the pair of adhesive layers to the inner face of the wall.

In accordance with another aspect of the invention, the method of construction can further include wrapping the wall into a tubular configuration and then bonding the single release paper to the wall to releasably maintain the wall in its tubular configuration.

In accordance with another aspect of the invention, the method of construction can further include wrapping the wall into the tubular configuration with the inner face facing radially outwardly.

In accordance with another aspect of the invention, the method of construction can further include forming the wall from interlaced yarn.

In accordance with another aspect of the invention, the method of construction can further include forming the wall from a nonwoven material.

BRIEF DESCRIPTION OF THE DRAWINGS

These and other aspects, features and advantages of the present invention will become more readily appreciated when considered in connection with the following detailed description of presently preferred embodiments and best mode, appended claims and accompanying drawings, in which:

DETAILED DESCRIPTION OF PRESENTLY PREFERRED EMBODIMENTS

Figure 1:
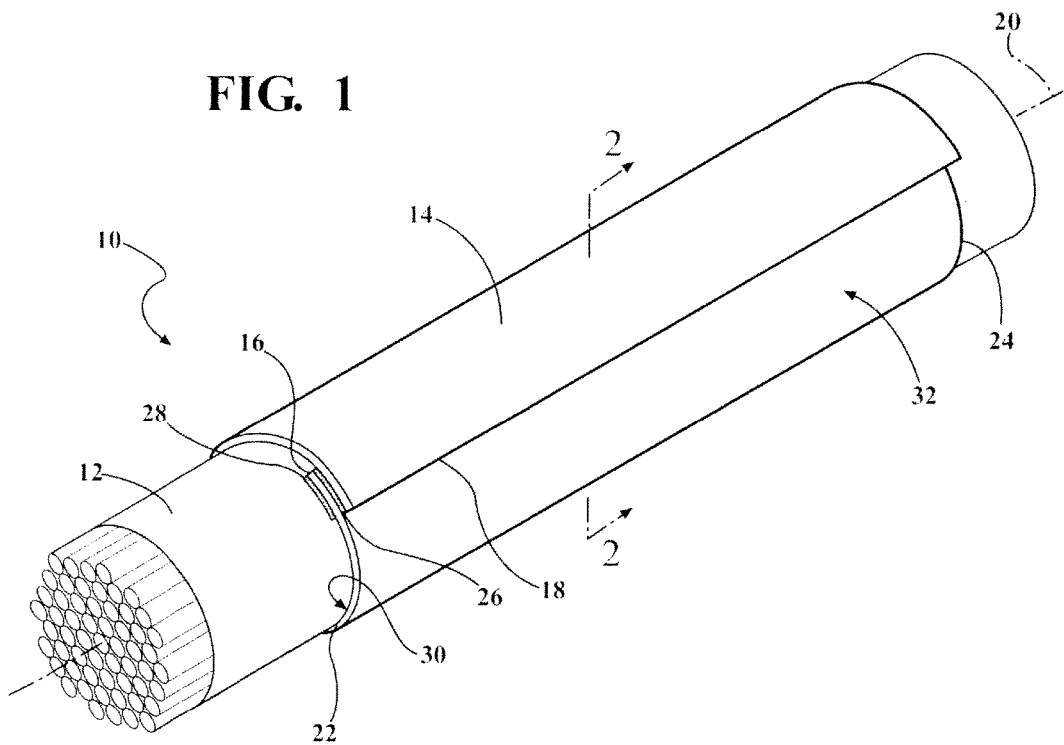
FIG. 1 is a perspective view of a sleeve constructed in accordance with one aspect of the invention shown wrapped about an elongate member to be protected by the sleeve.
Figure 2:
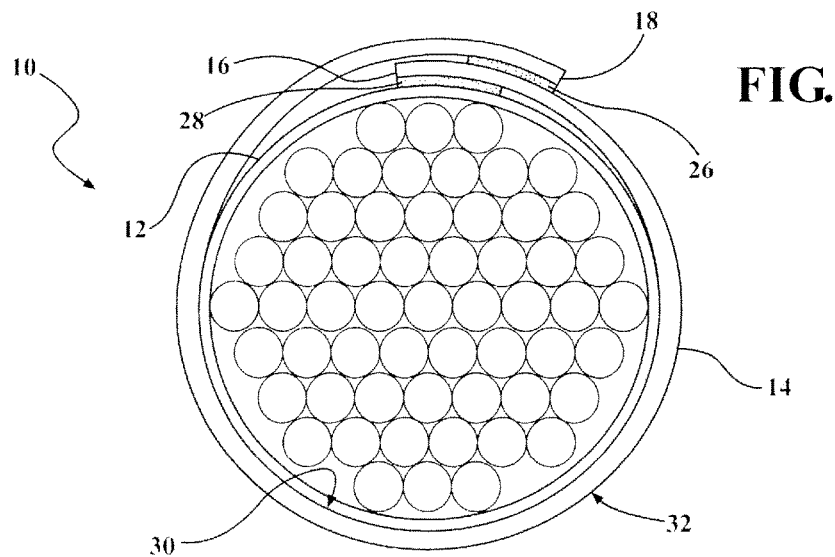
FIG. 2 is a cross-sectional view taken generally along the line 2-2 of FIG. 1.

Referring in more detail to the drawings, FIG. 1 illustrates a wrappable textile sleeve 10 constructed in accordance with one aspect of the invention shown wrapped about an elongate member 12 to be protected, such as a wire harness or pipe, by way of example and without limitation. The textile sleeve 10 has a wall 14 sized to be wrapped circumferentially about the elongate member 12 to be protected such that opposite, lengthwise extending edges 16, 18, which extend generally parallel to one another and generally parallel to a central longitudinal axis 20 of the sleeve 10 between opposite ends 22, 24, are brought into overlapping, fixed relation with one another. In addition to the opposite edges 16, 18 of the wall 14 being fixed in a circumferentially wrapped configuration, thereby providing the desired protection to the elongate member 12 about the entire circumference of the elongate member 12, the wall 14, as discussed further below, is fixed to the elongate member 12 to prevent inadvertent movement of the sleeve 10 relative to the elongate member 12. Accordingly, the sleeve 12 is assured of remaining in its intended protective position about the elongate member 12.

The textile wall 14, as schematically shown in the Figures, can be formed by interlacing yarn or yarns with one another, including monofilament and/or multifilament yarn, wherein the interlacing can be performed to form a woven, knitted, or braided structure. In addition to interlacing yarn or yarns, the wall 14 can also be formed as a nonwoven structure. It is to be understood that nonwoven structures are formed from a web of material including intertwined, relatively short fibers via a wet or dry process. The fibers can be provided as organic fibers, such as from jute, kenaf, hemp, or any other suitable cellulosic fibrous material, and also from any suitable recycled materials and/or waste stream materials and/or from inorganic fibers, including any type of polymeric materials, including heat-meltable material, for example, as a low temperature melt polymeric material, such as fibers of polyethylene, PET or Nylon. It should be recognized that other low melt polymeric materials could be used, such as thermoplastic bi-component fibers whose outer sheath, such as polypropylene, for example, melts when heated above its melting point.

Upon wrapping the wall 14 about the elongate member 12, the opposite edges 16, 18 of the wall 14 are fixed in the circumferentially wrapped "cigarette" configuration via a first adhesive layer 26 to provide the desired protection to the elongate member 12 about the entire circumference of the elongate member 12 and the wall 14 is fixed to the elongate member 12 via a second adhesive layer 28 to prevent inadvertent movement of the sleeve 10 relative to the elongate member 12. The first and second adhesive layers 26, 28 forms a pair of adhesive layers bonded to an inner face 30 of the wall 14 in spaced relation from one another, while an outer surface 32 of the wall 14, as manufactured, remains free of any adhesive or other fastening mechanism. The adhesive layers 26, 28 extend along the opposite edges 16, 18, shown as being immediately adjacent the opposite edges 16, 18, between the opposite ends 22, 24, wherein the adhesive layers 26, 28 are also shown as extending from one end 22 to the opposite end 24. With the adhesive layers 26, 28 being laterally spaced from one another, an intermediate portion 34 of the inner surface 30 is free of any adhesive. Accordingly, the amount of adhesive used in the construction of the wall 14 is minimized, and is significantly less than that if the entire inner surface 30 were covered with adhesive, and thus, the cost of the adhesive layers is greatly reduced from that if the entire inner surface 30 were covered with adhesive.

Figure 3:
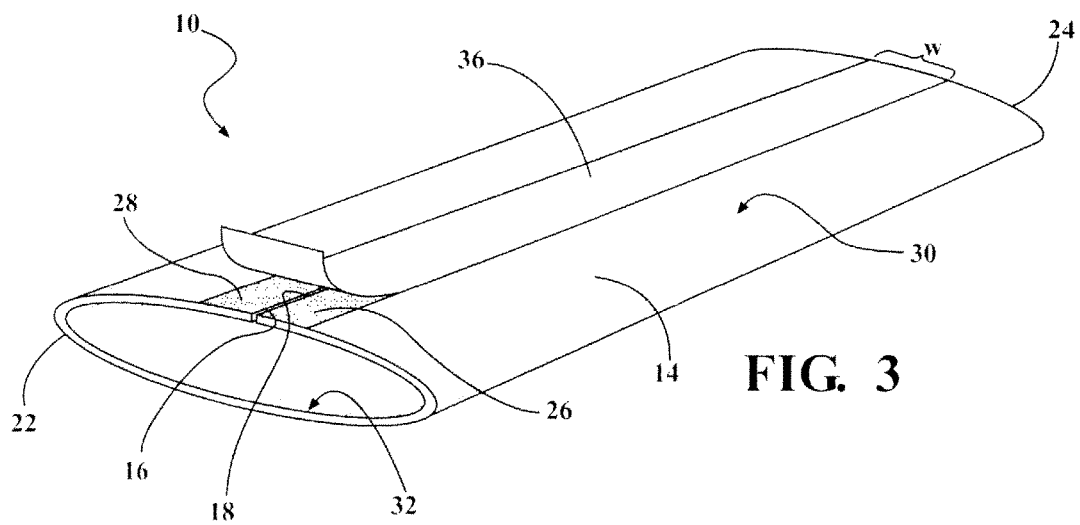
FIG. 3 is a perspective view of the sleeve of FIG. 1 shown in a "as manufactured", pre-use state.
Figure 4:
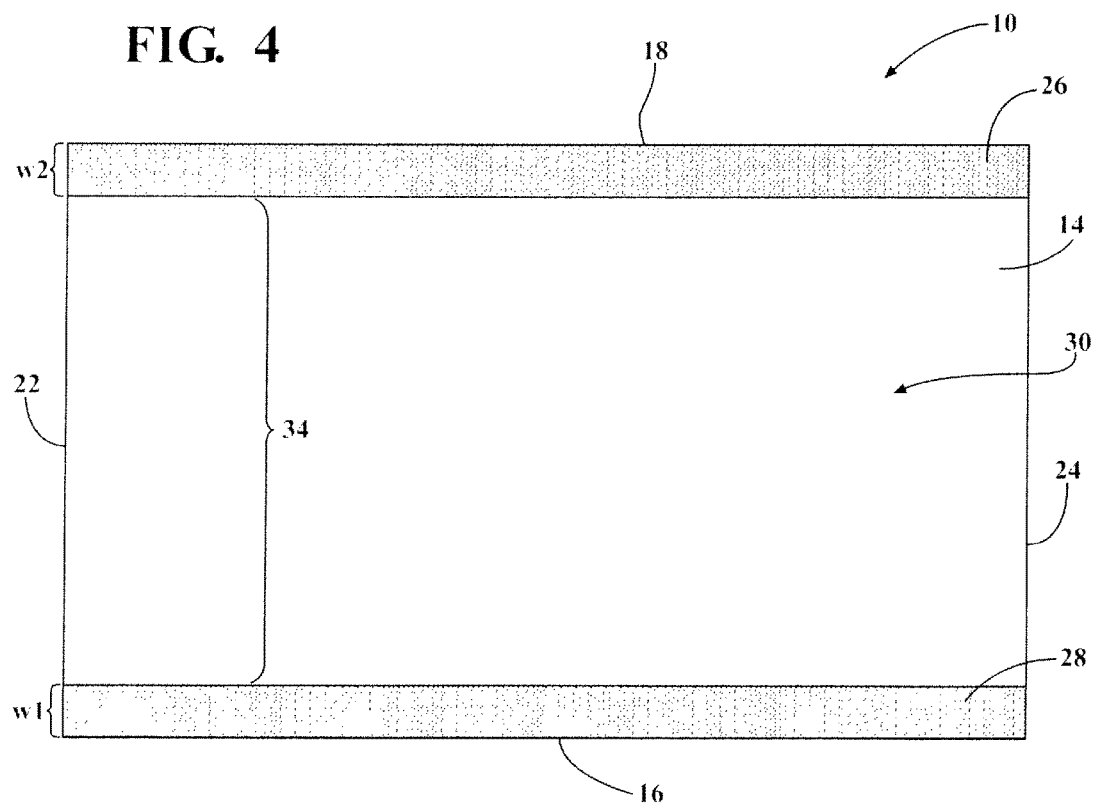
FIG. 4 is a plan view of the sleeve of FIG. 1 shown in an unwrapped, flattened state.

In construction of the sleeve 10, to prevent contamination of the adhesive layers 26, 28 and to preserve the adhesive layers 26, 28 for future use, a release paper 36 (FIG. 3) is releasably adhered to the pair of adhesive layers 26, 28. To minimized the amount of release paper necessary, and to reduce the envelope of the sleeve 10 for shipping and storage, the wall 14 is wrapped or folded to evert the wall 14 such that the inner surface 30 faces radially outwardly and the outer surface 32 faces radially inwardly. The opposite edges 16, 18 are brought into abutting or substantially abutting relation with one another such the adhesive layers 26, 28 are immediately adjacent one another. With the adhesive layers 26, 28 immediately adjacent one another, the width (W) of the release paper 36 needed to cover the adhesive layers 26, 28 is minimized, wherein the release paper 36 can be provided having a width that is equal to, or substantially equal to the width of each adhesive layer 26, 28 combined or added together (w1+w2).

Figure 5:
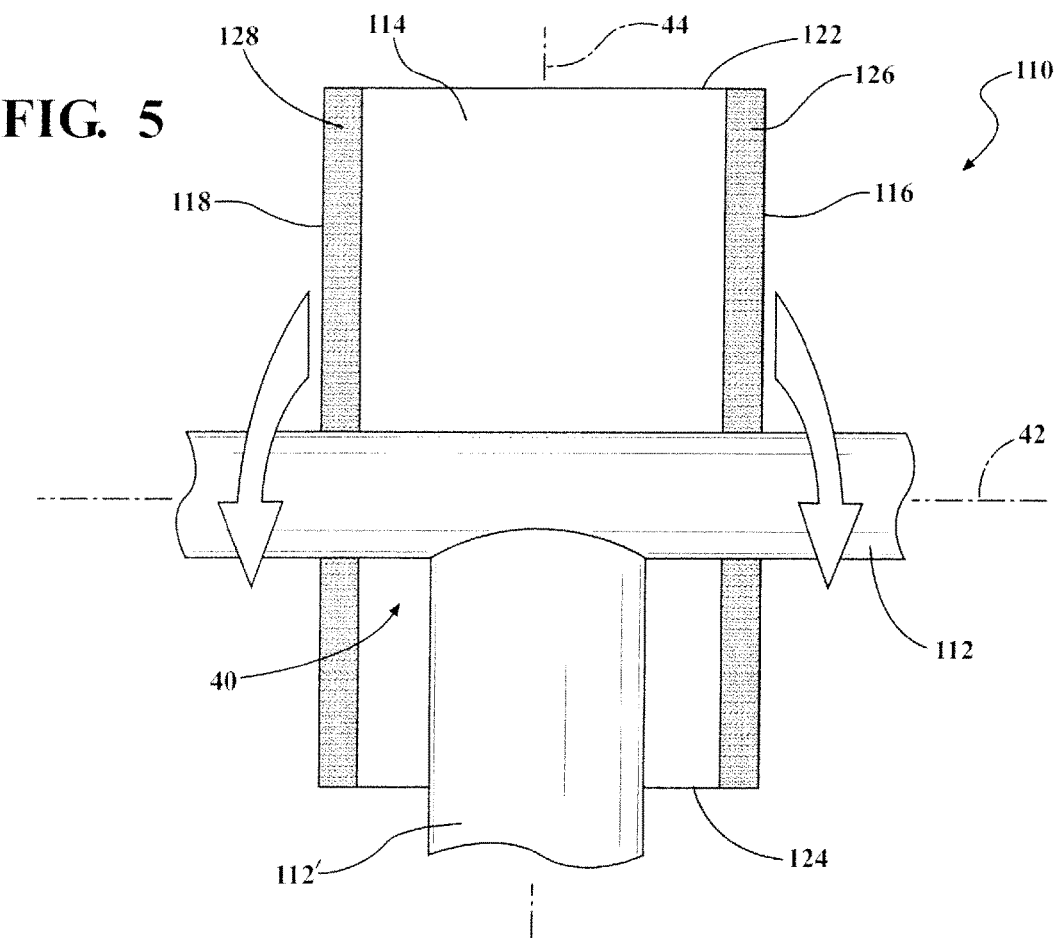
FIG. 5 is a plan view of the sleeve of FIG. 3 shown unwrapped with a T-shaped union of a pair of elongate members to be protected disposed thereon.

In FIG. 5, a sleeve 110 formed in accordance with another aspect of the invention is shown, wherein the same reference numerals, offset by a factor of 100, are used to identify like features. The sleeve 110 has a wall 114 constructed in the same fashion as discussed above for the wall 14. The notable difference is in how the wall is wrapped or folded in use. As such, the wall has first and second adhesive layers 126, 128 spaced from one another and extending along opposite edges 116, 118 between opposite ends 122, 124. Also, a release paper, as discussed above, is applied to the wrapped or folded wall 114 to releasably cover and protect the adhesive layers 126, 128 prior to use. With regard to both walls 14, 114, it should be recognized that the overall width (extending between opposite edges 16, 18, 116, 118 and length (extending between opposite ends 22, 24, 122, 124) of the wall 14, 114 can be formed as desired, depending on the end use of the respective sleeve 10, 110.

Figure 6:
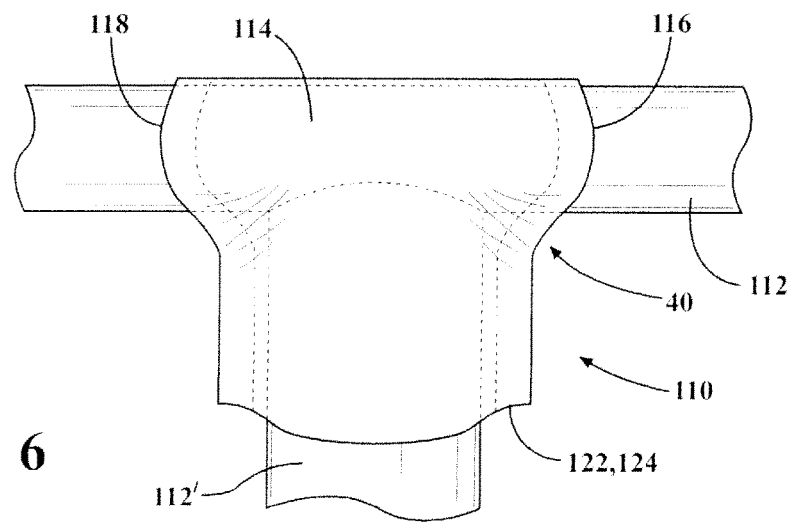
FIG. 6 is a plan view of the sleeve of FIG. 5 shown wrapped and fixed about the T-shaped union of the pair of elongate members.

In use, as shown in FIG. 6, rather than wrapping the wall 114 in cigarette fashion about a single elongate member, the wall 114 is wrapped or folded in half about a T-shaped union 40 formed by an intersection of a plurality of elongate members, shown as a pair of elongate members 112, 112'. The T-shaped union 40 is formed by a first elongate member 112 extending generally horizontally and a second elongate member 112' extending generally transversely to the first elongate member 112. During application, the elongate members 112, 112' are positioned as shown in FIG. 5, with the first horizontal elongate member 112 extending across an approximate lengthwise dividing centerline 42 of the wall 114 such that the first elongate member 112 extends across the opposite adhesive layers 126, 128 in bonding relation therewith. Meanwhile, the second elongate member 112' extends vertically along an approximate widthwise dividing centerline 44 of the wall 114 between the adhesive layers 126, 128, shown as being out of contact with the adhesive layer 126, 128. Then, the upper half of the wall 114 is folded over and about the first elongate member 112 to completely cover the T-shaped union 40 and to bring the adhesive layers 126, 128 into adhesive, fixed contact with themselves. Accordingly, each of the pair of adhesive layers 126, 128 is adapted to be adhered to a common elongate member 112 and each of the pair of adhesive layers 126, 128 is also adapted to be adhered to itself.

Many modifications and variations of the present invention are possible in light of the above teachings. It is, therefore, to be understood that the invention may be practiced otherwise than as specifically described, and that the scope of the invention is defined by any ultimately allowed claims.

What is claimed is:

1. A wrappable protective sleeve for providing protection to at least one elongate member contained therein, comprising:
    a flexible textile wall having opposite inner and outer faces bounded by opposite edges and opposite ends, said opposite edges extending lengthwise generally parallel to one another between said opposite ends;
    a pair of adhesive layers bonded to said inner face in spaced relation from one another, said adhesive layers extending along said opposite edges between said opposite ends adjacent said opposite edges; and
    wherein said wall is reverse folded into a pre-use tubular configuration with said inner face facing radially outwardly, and a release paper is adhered to said pair of adhesive layers on said inner face to maintain said wall in a pre-use state, wherein said opposite ends, extending between said release paper, are devoid of adhesive and said release paper is selectively removable to wrap said wall into an in-use state about the at least one elongate member with said inner face facing radially inwardly toward the at least one elongate member.

2. The wrappable protective sleeve of claim 1 wherein said opposite edges are spaced from one another along a width of said wall and said release paper has a width less than said width of said wall.

3. The wrappable protective sleeve of claim 2 wherein each of said adhesive layers has a width and said width of said release paper is substantially equal to the combined widths of said adhesive layers.

4. The wrappable protective sleeve of claim 1, wherein one of said adhesive layers of said pair of adhesive layers is adapted to be adhered to an outer surface of the at least one elongate member and the other of said adhesive layers of said pair of adhesive layers is adapted to be adhered to said outer face of said wall.

5. The wrappable protective sleeve of claim 1 wherein each of said pair of adhesive layers is adapted to be adhered to a common one of the at least one elongate member and each of said pair of adhesive layers is adapted to be adhered to itself.

6. The wrappable protective sleeve of claim 5 wherein the wrappable protective sleeve is adapted to be wrapped about a T-shaped union of the at least one elongate member.

7. The wrappable protective sleeve of claim 1 wherein said wall is formed of interlaced yarn.

8. The wrappable protective sleeve of claim 1 wherein said wall is formed of a nonwoven material.

9. A wrappable protective sleeve for providing protection to at least one elongate member contained therein, comprising:
    a flexible wall having an inner face configured to face toward said at least one elongate member and an outer face configured to face away from said at least one elongate member, said wall having opposite edges extending lengthwise between opposite ends, said opposite edges being configured in adjacent relation with one another;
    an adhesive layer disposed on said inner face of said wall along or adjacent each of said opposite edges; and
    a single release tape covering said adhesive layer and releasably maintaining said opposite edges in said adjacent relation with one another to maintain said wall in a tubular pre-use state, wherein said release paper is selectively removable to wrap said wall into an in-use state about the at least one elongate member with said inner face facing the at least one elongate member, wherein said adhesive layer provides an exposed first adhesive layer along or adjacent one of said opposite edges and an exposed second adhesive layer along or adjacent the other of said opposite edges upon removing said release tape from said adhesive layer, said exposed first adhesive layer being spaced from said exposed second adhesive layer by an adhesive free intermediate portion of said flexible wall that extends to adhesive devoid regions extending along said opposite ends.

* * * * *